US010303816B2

(12) United States Patent
Nakazawa

(10) Patent No.: US 10,303,816 B2
(45) Date of Patent: May 28, 2019

(54) POPULATION PROJECTION METHOD AND POPULATION PROJECTION APPARATUS

(71) Applicant: FUJITSU LIMITED, Kawasaki-shi, Kanagawa (JP)

(72) Inventor: Katsuhito Nakazawa, Saitama (JP)

(73) Assignee: FUJITSU LIMITED, Kawasaki (JP)

( * ) Notice: Subject to any disclaimer, the term of this patent is extended or adjusted under 35 U.S.C. 154(b) by 362 days.

(21) Appl. No.: 15/155,126

(22) Filed: May 16, 2016

(65) Prior Publication Data

US 2016/0371408 A1 Dec. 22, 2016

(30) Foreign Application Priority Data

Jun. 18, 2015 (JP) ................................ 2015-123255

(51) Int. Cl.

*G06F 17/50* (2006.01)
*G06Q 10/04* (2012.01)
*G06F 17/18* (2006.01)

(52) U.S. Cl.

CPC .......... *G06F 17/5009* (2013.01); *G06F 17/18* (2013.01); *G06Q 10/04* (2013.01); *G06F 2217/16* (2013.01)

(58) Field of Classification Search

CPC .................................................. G06F 17/5009
USPC ............................................ 703/6, 2; 705/2
See application file for complete search history.

(56) References Cited

U.S. PATENT DOCUMENTS 7,953,613 B2 * 5/2011 Gizewski ............ G06F 19/3456 705/3
2002/0128858 A1 9/2002 Fuller
2008/0162352 A1 * 7/2008 Gizewski ............ G06F 19/3456 705/50
2015/0100345 A1 * 4/2015 Holmes ............... G06F 19/3437 705/2

(Continued)

FOREIGN PATENT DOCUMENTS

JP 2003-242305 8/2003

OTHER PUBLICATIONS

CNOA—Chinese Office Action dated Apr. 18, 2018 for corresponding Chinese Application No. 201610407228.1, with English translation. **JP2003-242305 cited in the CNOA was previously submitted in the IDS filed on May 16, 2016.

(Continued)

*Primary Examiner* — Thai Q Phan
(74) *Attorney, Agent, or Firm* — Fujitsu Patent Center

(57) ABSTRACT

In a population projection apparatus, a memory stores past values of population changing components in each year within a first period. A computing circuit derives relational equations each representing a relationship between a change rate indicating a proportion relative to a population and an elapsed time period from the start of the first period, with respect to the population changing components. Next, the computing circuit calculates, using the relational equations, change rates of the population changing components in each year within a second period that starts from the year after the first period, and changes a part of the calculated change rates to change rates input as a scenario. Thereafter, the computing circuit calculates a population of each year within the second period on the basis of the population of the previous year and the change rates of the population changing components of that year.

4 Claims, 15 Drawing Sheets

START
S101 ACQUIRE POPULATION DATA
S102 ACQUIRE COMPONENT DATA
S103 CALCULATE COEFFICIENTS
S104 DERIVE COEFFICIENT CALCULATION FORMULAS
S105 DERIVE COMPONENT CALCULATION FORMULAS
S106 CALCULATE FUTURE COEFFICIENTS
S107 CALCULATE FUTURE COMPONENT VALUES
S108 CALCULATE FUTURE TOTAL POPULATION
S109 DISPLAY GRAPH
S110 IS SCENARIO DESIGNATED?
YES
S111 DISPLAY LIST OF COEFFICIENTS
S112 ACCEPT COEFFICIENTS REPRESENTING SCENARIO
S113 CALCULATE FUTURE COMPONENT VALUES IN ACCORDANCE WITH SCENARIO
S114 CALCULATE FUTURE TOTAL POPULATION IN ACCORDANCE WITH SCENARIO
S115 DISPLAY GRAPH
NO
S116 OUTPUT RESULT
END

(56) References Cited

U.S. PATENT DOCUMENTS

2015/0213160 A1* 7/2015 Bright ................ G06F 17/5009
703/6

OTHER PUBLICATIONS

EESR—The Extended European Search Report dated Oct. 31, 2016 for corresponding European Application No. 16169986.3. ** JP2003-242305 cited in the above listed EESR was previously submitted in the IDS filed on May 16, 2016.

EPOA—European Patent Office Action dated Jun. 7, 2017 in corresponding European Application No. 16169986.3. ** References cited in the EPOA were previously filed in the IDS.

* cited by examiner

| YEAR | TOTAL POPULATION |
|---|---|
| 2000 | 280,443 |
| 2001 | 280,141 |
| 2002 | 280,696 |
| 2003 | 280,846 |
| 2004 | 281,173 |
| 2005 | 280,950 |
| 2006 | 280,572 |
| 2007 | 280,267 |
| 2008 | 280,020 |
| 2009 | 280,199 |
| 2010 | 279,896 |
| 2011 | 279,662 |
| 2012 | 278,759 |
| 2013 | 282,645 |

| YEAR | NUMBER OF BIRTHS | NUMBER OF DEATHS | NUMBER OF IMMIGRANTS | NUMBER OF EMIGRANTS |
|---|---|---|---|---|
| 2000 | | | | |
| 2001 | 2,499 | 1,802 | 10,795 | 11,414 |
| 2002 | 2,488 | 1,808 | 10,420 | 10,613 |
| 2003 | 2,428 | 1,801 | 10,107 | 10,741 |
| 2004 | 2,349 | 1,890 | 9,801 | 10,363 |
| 2005 | 2,221 | 2,048 | 9,600 | 10,022 |
| 2006 | 2,320 | 2,149 | 9,605 | 10,008 |
| 2007 | 2,253 | 2,102 | 9,810 | 10,061 |
| 2008 | 2,195 | 2,235 | 9,662 | 9,888 |
| 2009 | 2,130 | 2,307 | 9,534 | 9,487 |
| 2010 | 2,104 | 2,382 | 9,200 | 9,317 |
| 2011 | 2,120 | 2,467 | 8,664 | 9,125 |
| 2012 | 2,122 | 2,501 | 9,148 | 9,654 |
| 2013 | 2,033 | 2,406 | 9,197 | 10,181 |

141 PAST-DATA MANAGEMENT TABLE

| YEAR | TOTAL POPULATION | NUMBER OF BIRTHS | NUMBER OF DEATHS | NUMBER OF IMMIGRANTS | NUMBER OF EMIGRANTS |
|---|---|---|---|---|---|
| 2000 | 280,443 | | | | |
| 2001 | 280,141 | 2,499 | 1,802 | 10,795 | 11,414 |
| 2002 | 280,696 | 2,488 | 1,808 | 10,420 | 10,613 |
| 2003 | 280,846 | 2,428 | 1,801 | 10,107 | 10,741 |
| 2004 | 281,173 | 2,349 | 1,890 | 9,801 | 10,363 |
| 2005 | 280,950 | 2,221 | 2,048 | 9,600 | 10,022 |
| 2006 | 280,572 | 2,320 | 2,149 | 9,605 | 10,008 |
| 2007 | 280,267 | 2,253 | 2,102 | 9,810 | 10,061 |
| 2008 | 280,020 | 2,195 | 2,235 | 9,662 | 9,888 |
| 2009 | 280,199 | 2,130 | 2,307 | 9,534 | 9,487 |
| 2010 | 279,896 | 2,104 | 2,382 | 9,200 | 9,317 |
| 2011 | 279,662 | 2,120 | 2,467 | 8,664 | 9,125 |
| 2012 | 278,759 | 2,122 | 2,501 | 9,148 | 9,654 |
| 2013 | 282,645 | 2,033 | 2,406 | 9,197 | 10,181 |

FIG. 7

141 PAST-DATA MANAGEMENT TABLE

| YEAR | TOTAL POPULATION | NUMBER OF BIRTHS | NUMBER OF DEATHS | NUMBER OF IMMIGRANTS | NUMBER OF EMIGRANTS |
|---|---|---|---|---|---|
| 2000 | 280,443 | | | | |
| 2001 | 280,141 | 2,499 | 1,802 | 10,795 | 11,414 |
| 2002 | 280,696 | 2,488 | 1,808 | 10,420 | 10,613 |
| 2003 | 280,846 | 2,428 | 1,801 | 10,107 | 10,741 |
| 2004 | 281,173 | 2,349 | 1,890 | 9,801 | 10,363 |
| 2005 | 280,950 | 2,221 | 2,048 | 9,600 | 10,022 |
| 2006 | 280,572 | 2,320 | 2,149 | 9,605 | 10,008 |
| 2007 | 280,267 | 2,253 | 2,102 | 9,810 | 10,061 |
| 2008 | 280,020 | 2,195 | 2,235 | 9,662 | 9,888 |
| 2009 | 280,199 | 2,130 | 2,307 | 9,534 | 9,487 |
| 2010 | 279,896 | 2,104 | 2,382 | 9,200 | 9,317 |
| 2011 | 279,662 | 2,120 | 2,467 | 8,664 | 9,125 |
| 2012 | 278,759 | 2,122 | 2,501 | 9,148 | 9,654 |
| 2013 | 282,645 | 2,033 | 2,406 | 9,197 | 10,181 |

142 COEFFICIENT MANAGEMENT TABLE

| BIRTH RATE | DEATH RATE | IMMIGRATION RATE | EMIGRATION RATE |
|---|---|---|---|
| 0.00891 | 0.00643 | 0.03849 | 0.04070 |
| 0.00888 | 0.00645 | 0.03720 | 0.03788 |
| 0.00865 | 0.00642 | 0.03601 | 0.03827 |
| 0.00836 | 0.00673 | 0.03490 | 0.03690 |
| 0.00790 | 0.00728 | 0.03414 | 0.03564 |
| 0.00826 | 0.00765 | 0.03419 | 0.03562 |
| 0.00803 | 0.00749 | 0.03496 | 0.03586 |
| 0.00783 | 0.00797 | 0.03447 | 0.03528 |
| 0.00761 | 0.00824 | 0.03405 | 0.03388 |
| 0.00751 | 0.00850 | 0.03283 | 0.03325 |
| 0.00757 | 0.00881 | 0.03095 | 0.03260 |
| 0.00759 | 0.00894 | 0.03271 | 0.03452 |
| 0.00729 | 0.00863 | 0.03299 | 0.03652 |

| TIME | BIRTH RATE |
|---|---|
| 1 | 0.00891 |
| 2 | 0.00888 |
| 3 | 0.00865 |
| 4 | 0.00836 |
| 5 | 0.00790 |
| 6 | 0.00826 |
| 7 | 0.00803 |
| 8 | 0.00783 |
| 9 | 0.00761 |
| 10 | 0.00751 |
| 11 | 0.00757 |
| 12 | 0.00759 |
| 13 | 0.00729 |

| YEAR | NUMBER OF BIRTHS | POPULATION | BIRTH RATE |
|---|---|---|---|
| 2000 | | 280,443 | |
| 2001 | 2,499 | 280,141 | 0.00891 |
| 2002 | 2,488 | 280,696 | 0.00888 |
| 2003 | 2,428 | 280,846 | 0.00865 |
| 2004 | 2,349 | 281,173 | 0.00836 |
| 2005 | 2,221 | 280,950 | 0.00790 |
| 2006 | 2,320 | 280,572 | 0.00826 |
| 2007 | 2,253 | 280,267 | 0.00803 |
| 2008 | 2,195 | 280,020 | 0.00783 |
| 2009 | 2,130 | 280,199 | 0.00761 |
| 2010 | 2,104 | 279,896 | 0.00751 |
| 2011 | 2,120 | 279,662 | 0.00757 |
| 2012 | 2,122 | 278,759 | 0.00759 |
| 2013 | 2,033 | 282,645 | 0.00729 |

145 PROJECTION RESULT

| YEAR | TOTAL POPULATION |
|---|---|
| 2000 | 280,443 |
| 2001 | 280,141 |
| 2002 | 280,696 |
| 2003 | 280,846 |
| 2004 | 281,173 |
| 2005 | 280,950 |
| 2006 | 280,572 |
| 2007 | 280,267 |
| 2008 | 280,020 |
| 2009 | 280,199 |
| 2010 | 279,896 |
| 2011 | 279,662 |
| 2012 | 278,759 |
| 2013 | 282,645 |
| 2014 | 28x,xxx (PROJECTION VALUE) |
| 2015 | 28x,xxx (PROJECTION VALUE) |
| 2016 | 28x,xxx (PROJECTION VALUE) |
| ⋮ | ⋮ |

142 COEFFICIENT MANAGEMENT TABLE

| YEAR | BIRTH RATE |
|---|---|
| 2000 | – |
| 2001 | 0.00883 |
| 2002 | 0.00869 |
| 2003 | 0.00855 |
| 2004 | 0.00841 |
| 2005 | 0.00828 |
| 2006 | 0.00814 |
| 2007 | 0.00801 |
| 2008 | 0.00788 |
| 2009 | 0.00775 |
| 2010 | 0.00763 |
| 2011 | 0.00750 |
| 2012 | 0.00738 |
| 2013 | 0.00726 |
| 2014 | 0.00714 |
| 2015 | 0.00703 |
| 2016 | 0.00692 |
| | 0.00680 |
| | 0.00669 |
| | 0.00658 |
| 2020 | 0.00648 |
| | 0.00637 |
| | 0.00627 |
| | 0.00617 |
| | 0.00607 |
| | 0.00597 |
| | 0.00587 |
| | 0.00578 |
| | 0.00568 |
| | 0.00559 |
| 2030 | 0.00550 |
| | 0.00541 |
| | 0.00533 |
| | 0.00524 |
| | 0.00515 |
| | 0.00507 |
| | 0.00499 |
| | 0.00491 |
| | 0.00483 |
| | 0.00475 |
| 2040 | 0.00467 |
| | 0.00460 |
| | 0.00452 |
| | 0.00445 |
| | 0.00438 |
| | 0.00431 |
| | 0.00424 |
| | 0.00417 |
| | 0.00410 |
| | 0.00403 |
| 2050 | 0.00397 |

DATA REPLACEMENT

| SCENARIO A | SCENARIO B | SCENARIO C |
|---|---|---|
| 0.00896 | 0.00702 | 0.00768 |
| 0.00896 | 0.00712 | 0.00833 |
| 0.00896 | 0.00722 | 0.00898 |
| 0.00896 | 0.00732 | 0.00963 |
| 0.00896 | 0.00742 | 0.01028 |
| 0.00896 | 0.00752 | 0.01093 |
| 0.00896 | 0.00762 | 0.01158 |
| 0.00896 | 0.00772 | 0.01223 |
| 0.00896 | 0.00782 | 0.01288 |
| 0.00896 | 0.00792 | 0.01353 |
| 0.00896 | 0.00802 | 0.01353 |
| 0.00896 | 0.00812 | 0.01353 |
| 0.00896 | 0.00822 | 0.01353 |
| 0.00896 | 0.00832 | 0.01353 |
| 0.00896 | 0.00842 | 0.01353 |
| 0.00896 | 0.00852 | 0.01353 |
| 0.00896 | 0.00862 | 0.01353 |
| 0.00896 | 0.00872 | 0.01353 |
| 0.00896 | 0.00882 | 0.01353 |
| 0.00896 | 0.00892 | 0.01353 |
| 0.00896 | 0.00902 | 0.01353 |
| 0.00896 | 0.00912 | 0.01353 |
| 0.00896 | 0.00922 | 0.01353 |
| 0.00896 | 0.00932 | 0.01353 |
| 0.00896 | 0.00942 | 0.01353 |
| 0.00896 | 0.00952 | 0.01353 |
| 0.00896 | 0.00962 | 0.01353 |
| 0.00896 | 0.00972 | 0.01353 |
| 0.00896 | 0.00982 | 0.01353 |
| 0.00896 | 0.00992 | 0.01353 |
| 0.00896 | 0.01002 | 0.01353 |
| 0.00896 | 0.01012 | 0.01353 |
| 0.00896 | 0.01022 | 0.01353 |
| 0.00896 | 0.01032 | 0.01353 |
| 0.00896 | 0.01042 | 0.01353 |

POPULATION PROJECTION METHOD AND POPULATION PROJECTION APPARATUS

CROSS-REFERENCE TO RELATED APPLICATION

This application is based upon and claims the benefit of priority of the prior Japanese Patent Application No. 2015-123255, filed on Jun. 18, 2015, the entire contents of which are incorporated herein by reference.

FIELD

The embodiments discussed herein relate to a population projection method and a population projection apparatus.

BACKGROUND

Currently, future population decrease, declining birth rate, and aging population are large social problems in Japan, and local municipalities are struggling to perform optimal fiscal management, considering these problems. In order to continuously provide an administrative service of a high degree of residents' satisfaction in local municipalities in future, it is important to select optimal measures after planning these measures based on a prediction of a future population and after verifying effects when these measures are introduced.

A prediction technology of a future population is, for example, a cohort component method. A cohort is a group of people born in the same period. The cohort component method assumes future values of two "population changing components", which are "natural growth and decline" (birth and death) and "net migration" (emigration and immigration), with respect to each cohort, and projects a future population on the basis of the assumed future values. In the cohort component method, cohorts of 5-year intervals (5-year age groups) are used, for example.

Note that a social structure projection system capable of projecting a social structure from fewer data is also considered.

See, for example, Japanese Laid-open Patent Publication No. 2003-242305.

When a population is projected by the cohort component method, population projection values of 5-year age groups are calculated for each 5-year period for example, but it is difficult to analyze a scenario in consideration of change in future birth rate, and to verify effects of introduced measures, on the basis of the population projection result. For example, in the cohort component method, the birth rate of each 5-year age group is manipulated to analyze a scenario of an improved birth rate, which makes its setting more complicated. Also, it is difficult to reflect, in the population projection, a scenario in which the birth rate improves from a year that is not at a boundary between 5-year periods. As described above, the cohort component method is not appropriate for analyzing a scenario that assumes changes in components which affect future population change.

SUMMARY

According to one aspect, there is provided a population projection method including: deriving, by a processor, relational equations each representing a relationship between a change rate indicating an increased or decreased proportion relative to a population and an elapsed time period from a start time of a first period, with respect to a plurality of population changing components, based on component information indicating past values of the population changing components in a specific area in each year within the first period, wherein the population changing components are a number of births, a number of deaths, a number of immigrants, and a number of emigrants relevant to population dynamics; calculating, by the processor, change rates of the population changing components in each year within a second period that starts from a year after the first period, based on the relational equations; changing a part of the calculated change rates to change rates that are input as a scenario; and acquiring, by the processor, a population of a last year of the first period, and for each year within the second period in order from a first year of the second period as a population calculation target year, calculating a population of the population calculation target year, based on a previous population of a year before the population calculation target year and the change rates of the population changing components of the population calculation target year.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a past-data management table;

FIG. 11 illustrates an example of a projection result;

FIG. 13 illustrates a change example of coefficient values;

DESCRIPTION OF EMBODIMENTS

Figure 1:
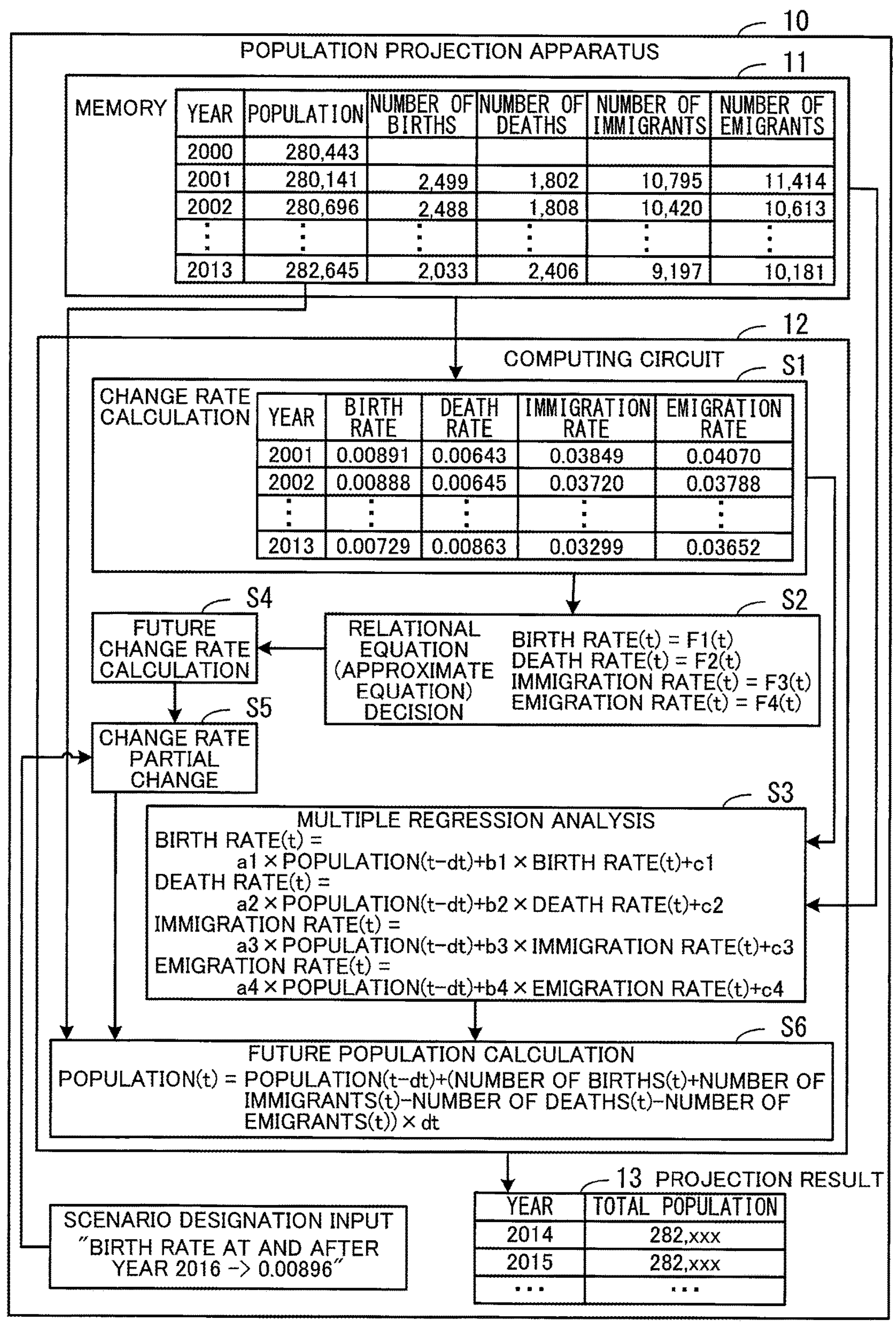
FIG. 1 illustrates an exemplary configuration of a population projection apparatus according to a first embodiment.

Several embodiments will be described below with reference to the accompanying drawings, wherein like reference numerals refer to like elements throughout.

Note that each embodiment may be combined with another embodiment or other embodiments, unless the combined embodiments contradict each other.

First Embodiment

FIG. 1 illustrates an exemplary configuration of a population projection apparatus according to the first embodiment. The population projection apparatus 10 includes a memory 11 and a computing circuit 12. The memory 11 stores component information indicating values of a plurality of population changing components in a specific area for each year within a past first period. The first period is equal to or longer than 10 years, for example. Here, the population changing components are the number of births, the number of deaths, the number of immigrants, and the number of emigrants relevant to dynamics of a population. Also, the memory 11 stores population information indicating a population of each year in the first period. For example, the memory 11 stores a population, the number of births, the number of deaths, the number of immigrants, and the number of emigrants, in association with each year in the first period.

The computing circuit 12 projects a future population on the basis of the information stored in the memory 11. For example, the computing circuit 12 calculates a change rate indicating an increased or decreased proportion relative to a population, with respect to each of the population changing components, on the basis of the component information (step S1). A change rate of a population changing component of a certain year is calculated by dividing the value of the population changing component of the year by the population of the previous year, for example. The change rate of the number of births is a birth rate, and the change rate of the number of deaths is a death rate, and the change rate of the number of immigrants is an immigration rate, and the change rate of the number of emigrants is an emigration rate.

Thereafter, the computing circuit 12 derives a relational equation representing a relationship between a change rate and an elapsed time period from a start time of the first period, with respect to each of the population changing components (step S2). For example, the computing circuit 12 calculates an approximate equation representing a temporal change of a change rate of each of the population changing components on the basis of the change rates calculated in step S1, and takes the approximate equation as the relational equation.

Also, the computing circuit 12 performs multiple regression analysis, using the population and the change rates of the population changing components as explanatory variables, and the population changing components as response variables, with respect to each of the population changing components, on the basis of the population information and the component information (step S3). Then, the computing circuit 12 takes a regression equation obtained as a result of the multiple regression analysis, as an equation for calculating a value of a population changing component, with respect to each of the population changing components.

Thereafter, the computing circuit 12 calculates a change rate of each of the population changing components in each future year, on the basis of the relational equation derived in step S2 (step S4). For example, a change rate of each year within a second period that starts from the year after the first period is calculated. Also, the computing circuit 12 changes a part of the calculated change rates to the change rates which are input as a scenario (step S5).

Then, the computing circuit 12 calculates a future population of each year within the second period and outputs a population projection result 13 (step S6). For example, the computing circuit 12 acquires the population of the last year of the first period from the memory 11. Thereafter, the computing circuit 12 sets each year within the second period as a population calculation target year in order from the first year of the second period, and calculates a population of the calculation target year on the basis of the population of the year before the calculation target year and the change rates of the population changing components of the calculation target year. For example, the computing circuit 12 calculates values of the population changing components in the calculation target year, from the population of the year before the calculation target year and the change rates of the population changing components of the calculation target year, on the basis of the regression equations of the population changing components. Then, the computing circuit 12 adds the number of births and the number of immigrants of the calculation target year to, and subtracts the number of deaths and the number of emigrants of the calculation target year from, the population of the year before the calculation target year, and sets the calculation result as the population of the calculation target year.

As described above, the population projection apparatus 10 according to the first embodiment can easily change a part of the future change rates of the population changing components which are calculated in the future population calculation process. For example, in the example of FIG. 1, birth rates at and after a specific year are changed. Then, a future population is projected by using the changed change rates. As a result, it becomes easy to analyze a scenario that assumes changes in the components which affect future population change.

That is, in the conventional cohort component method, birth rates of all cohorts are to be set appropriately, when the birth rate of a specific year is changed to calculate a population. In addition, when cohorts of 5-year age groups are used, a population is projected for each 5 years, and thus detailed parameter setting, such as change of the birth rate of an arbitrary year, is difficult. Hence, it is difficult to analyze a scenario in consideration of change of a future birth rate, and to verify effects of introduced measures. Also, versatility of the cohort component method is too low to apply the cohort component method to prediction of matters that are highly related to population change (for example, revenue, the number of facilities related to administrative service, waste generation amount, etc.). In contrast, the population projection apparatus 10 according to the first embodiment uses values including a birth rate and the like of each future year in a population projection procedure, so that detailed scenario analysis is easily performed by changing those values in accordance with a scenario. As a result, accurate prediction based on a population projection result is enabled, with respect to the matters highly related to population change.

Further, the cohort component method uses past data of the number of births and the number of deaths, net migration (the number of immigrants+the number of emigrants) corresponding to each 5-year age group and each gender, and therefore an extremely large amount of work is done to collect the data. Also, when the data is difficult to collect, correct calculation is unable to be performed. In contrast, the population projection apparatus 10 illustrated in the first embodiment uses only dynamics statistics, such as a total population and the number of births of each year in a predetermined period, and thus data is collected easily. That is, population projection is enabled with regard to a municipality that does not have the data relevant to populations of 5-year age groups.

Also, in the first embodiment, approximate equations of change rates (birth rate, death rate, immigration rate, emigration rate) are generated to calculate future change rates accurately, and the values of the population changing components (the number of births, the number of deaths, the number of immigrants, the number of emigrants) are calculated by multiple regression analysis. In the first embodiment, a population is projected highly accurately from a small amount of data, by making full use of a statistical calculation method, such as multiple regression analysis.

Although, in the example of FIG. 1, a part of the change rates, such as a birth rate, is assumed to be changed on the basis of a scenario, a population may be projected without changing the change rates, by assuming a case in which the birth rate and the like transitions in the current situation. In that case, step S5 of FIG. 1 would be omitted.

Note that the computing circuit 12 can be configured with a processor in the population projection apparatus 10, for example. Also, the memory 11 can be configured with a memory in the population projection apparatus 10, for example.

Second Embodiment

Next, the second embodiment will be described. In the second embodiment, the population projection apparatus 10 according to the first embodiment is configured with a computer. In the second embodiment, the computer projects a future population on the basis of populations, natural growth and decline, and net migration of all ages in a nation or a local municipality.

Figure 2:
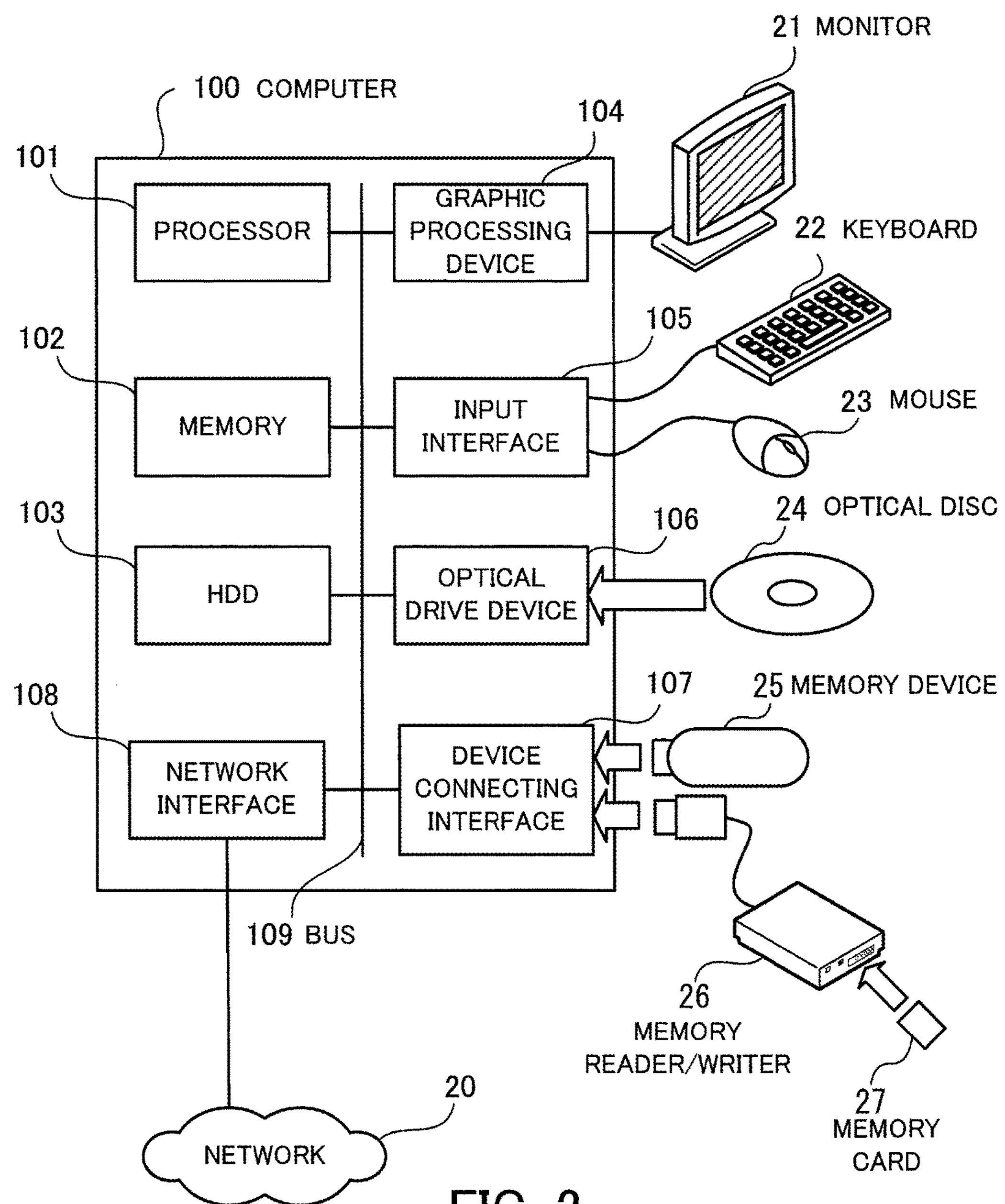
FIG. 2 illustrates one exemplary hardware configuration of a computer used in a second embodiment.

FIG. 2 illustrates an exemplary hardware configuration of the computer used in the second embodiment. Each device of the computer 100 is controlled by a processor 101. The processor 101 is connected to a memory 102 and a plurality of peripheral devices via a bus 109. The processor 101 may be a multiprocessor. The processor 101 is, for example, a central processing unit (CPU), a micro processing unit (MPU), or a digital signal processor (DSP). At least a part of functions implemented by executing programs in the processor 101 may be configured with an electronic circuit, such as an application specific integrated circuit (ASIC) or a programmable logic device (PLD).

The memory 102 is used as a main memory device of the computer 100. The memory 102 temporarily stores at least a part of operating system (OS) programs and application programs that are executed by the processor 101. Also, the memory 102 stores various types of data that are utilized in processing by the processor 101. The memory 102 is, for example, a volatile semiconductor memory device, such as a random access memory (RAM).

The peripheral devices connected to the bus 109 include a hard disk drive (HDD) 103, a graphic processing device 104, an input interface 105, an optical drive device 106, a device connecting interface 107, and a network interface 108.

The HDD 103 writes data into and reads data from an internal disk magnetically. The HDD 103 is used as an auxiliary memory device of the computer 100. The HDD 103 stores OS programs, application programs, and various types of data. Note that the auxiliary memory device may be a non-volatile semiconductor memory device (i.e., solid state drive or SSD), such as a flash memory.

The graphic processing device 104 is connected to a monitor 21. The graphic processing device 104 displays an image on a screen of the monitor 21 in accordance with an instruction from the processor 101. The monitor 21 is, for example, a display device using a cathode ray tube (CRT) or a liquid crystal display device.

The input interface 105 is connected to a keyboard 22 and a mouse 23. The input interface 105 supplies to the processor 101 a signal sent from the keyboard 22 and the mouse 23. Note that the mouse 23 is an example of pointing device, and other pointing devices may be used. Other pointing devices are, for example, a touch panel, a tablet, a touch pad, and a trackball.

The optical drive device 106 reads data recorded in an optical disc 24, by using laser light or the like. The optical disc 24 is a portable storage medium in which data is recorded in a readable manner by reflection of light. The optical disc 24 is, for example, a Digital Versatile Disc (DVD), a DVD-RAM, a Compact Disc Read Only Memory (CD-ROM), a Compact Disc Recordable (CD-R) or a Compact Disc ReWritable (CD-RW).

The device connecting interface 107 is a communication interface for connecting peripheral devices to the computer 100. For example, the device connecting interface 107 is connected to a memory device 25 and a memory reader/writer 26. The memory device 25 is a storage medium having a communication function with the device connecting interface 107. The memory reader/writer 26 is a device that writes data into a memory card 27 or reads data from the memory card 27. The memory card 27 is a card storage medium.

The network interface 108 is connected to a network 20. The network interface 108 transmits data to and receives data from other computers or communication devices via the network 20.

The processing function of the second embodiment is implemented by the above hardware configuration. Note that the population projection apparatus 10 illustrated in the first embodiment can also be configured with the same hardware as the computer 100 illustrated in FIG. 2.

The computer 100 implements the processing function of the second embodiment, by executing a program stored in a computer-readable storage medium, for example. The program describing a procedure executed by the computer 100 may be stored in various storage media. For example, the program executed by the computer 100 can be stored in the HDD 103. The processor 101 loads at least a part of the program into the memory 102 from the HDD 103, and executes the program. Also, the program executed by the computer 100 may be stored in a portable storage medium, such as the optical disc 24, the memory device 25, and the memory card 27. The program stored in the portable storage medium is executable after installed in the HDD 103, by the control from the processor 101, for example. Also, the processor 101 may read a program directly from a portable storage medium to execute the program.

Figure 3:
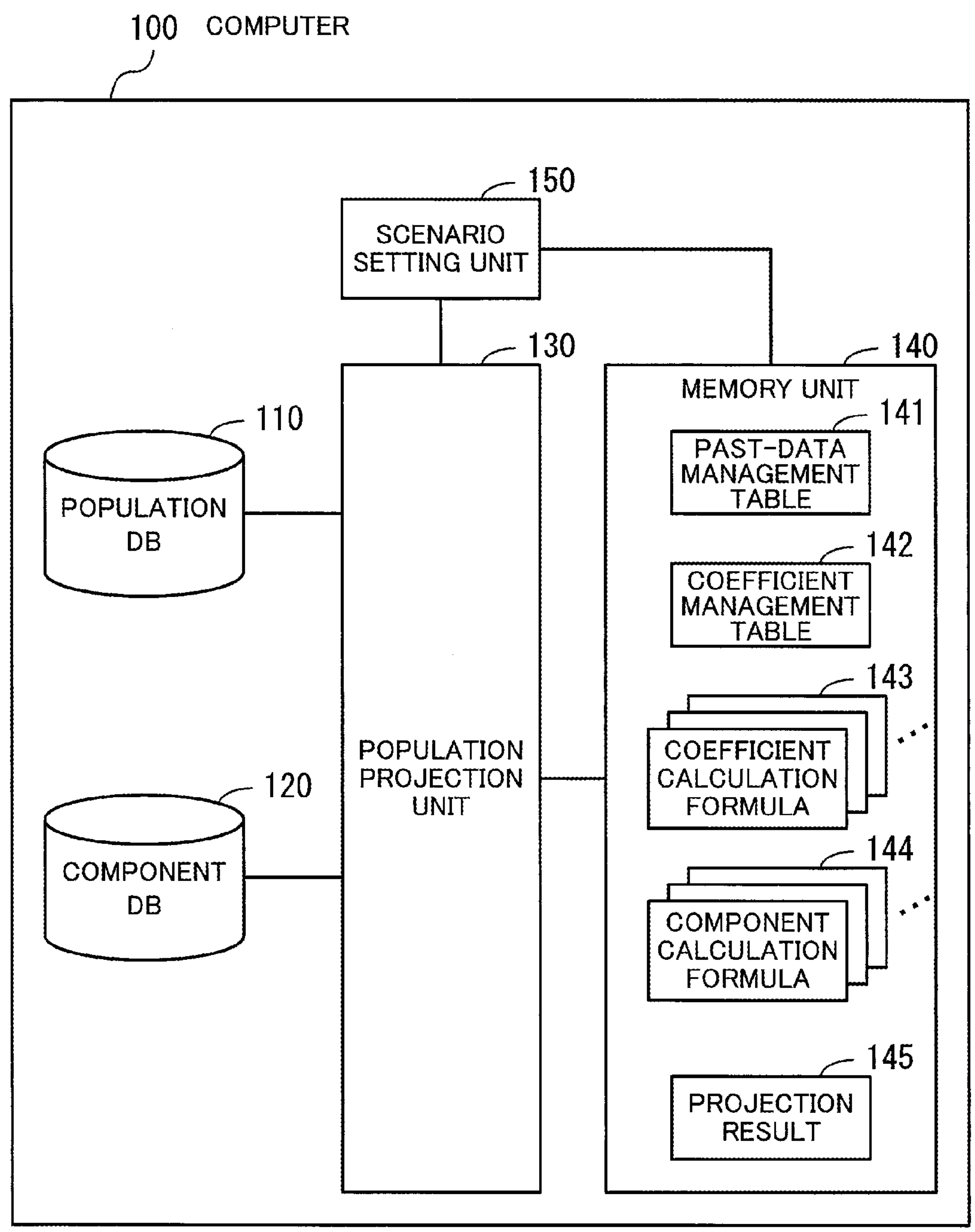
FIG. 3 is a block diagram illustrating a population projection function in a computer.

FIG. 3 is a block diagram illustrating a population projection function in the computer. The computer 100 includes a population database (DB) 110, a component DB 120, a population projection unit 130, a memory unit 140, and a scenario setting unit 150.

The population DB 110 stores data (population data) indicating transition of population in a predetermined past period of a specific nation or municipality. For example, a part of the memory region of the HDD 103 is used as the population DB 110.

The component DB 120 stores values (component data) of the components relevant to past population change of the specific nation or municipality. The components include components indicating natural growth and decline (the number of births, the number of deaths) and components indicating net migration (the number of immigrants, the number of emigrants). For example, a part of the memory region of the HDD 103 is used as the component DB 120.

Note that the data including the population data and the component data, which are acquired as actual population dynamics of the past, is referred to as past data.

The population projection unit 130 projects transition of future population on the basis of the information in the population DB 110 and the component DB 120. Note that the population projection unit 130 stores intermediate data that is generated during a population projection procedure, in the memory unit 140. Also, when the intermediate data in the memory unit 140 is changed by the scenario setting unit 150, the population projection unit 130 projects a future population on the basis of the changed data.

The memory unit 140 stores the intermediate data generated by the population projection unit 130. For example, the memory unit 140 stores a past-data management table 141, a coefficient management table 142, a plurality of coefficient calculation formulas 143, a plurality of component calculation formulas 144, and a projection result 145. The past-data management table 141 is a data table for managing past data of population, natural growth and decline, and net migration, which are read from the population DB 110 and the component DB 120. The coefficient management table 142 is a data table for setting coefficients that represent amounts of change per unit period (for example, 1 year) with respect to the respective components. A coefficient is an example of a change rate in the first embodiment. The coefficient calculation formulas 143 are to calculate future coefficients of the respective components. The component calculation formulas 144 are to calculate future values of the respective components. The projection result 145 is projection values of total population in predetermined future years, which are calculated by the population projection unit 130. Note that the memory unit 140 can be a part of the memory region of the memory 102, for example.

The scenario setting unit 150 sets a future scenario of coefficients of the components in accordance with an input from a user. For example, the scenario setting unit 150 rewrites coefficients in the coefficient management table 142, in accordance with the scenario that the user wishes.

Note that in FIG. 3 the lines that connect between the blocks indicate a part of communication channels, and communication channels other than the depicted communication channels are also usable. Also, the function of each block illustrated in FIG. 3 is implemented by causing a computer to execute a program module corresponding to the block, for example.

Figure 4:
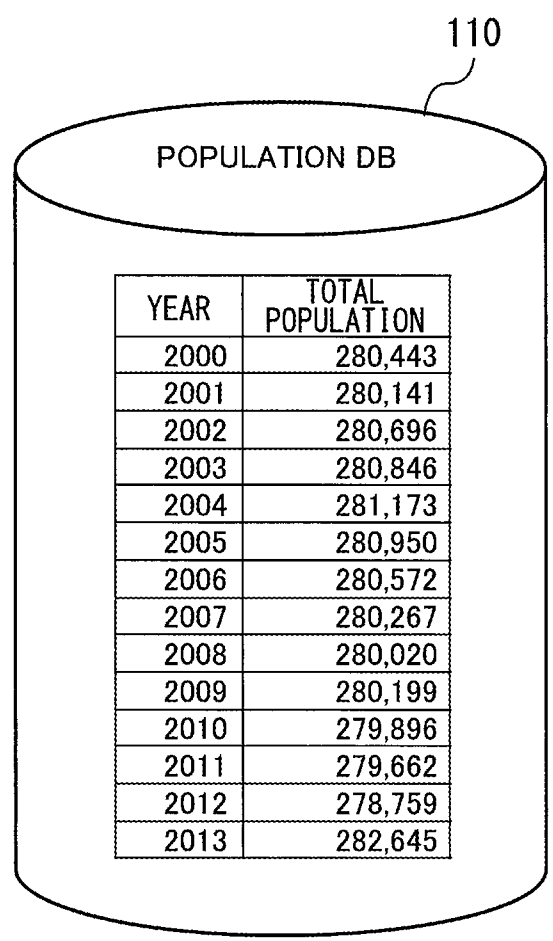
FIG. 4 illustrates an example of a population DB.

Next, the content of each DB will be described specifically. FIG. 4 illustrates an example of the population DB. In the population DB 110, a total population (population including males and females of all ages) at the end of a year is set for each year. In the example of FIG. 4, the total populations from year 2000 to year 2013 are set.

Figure 5:
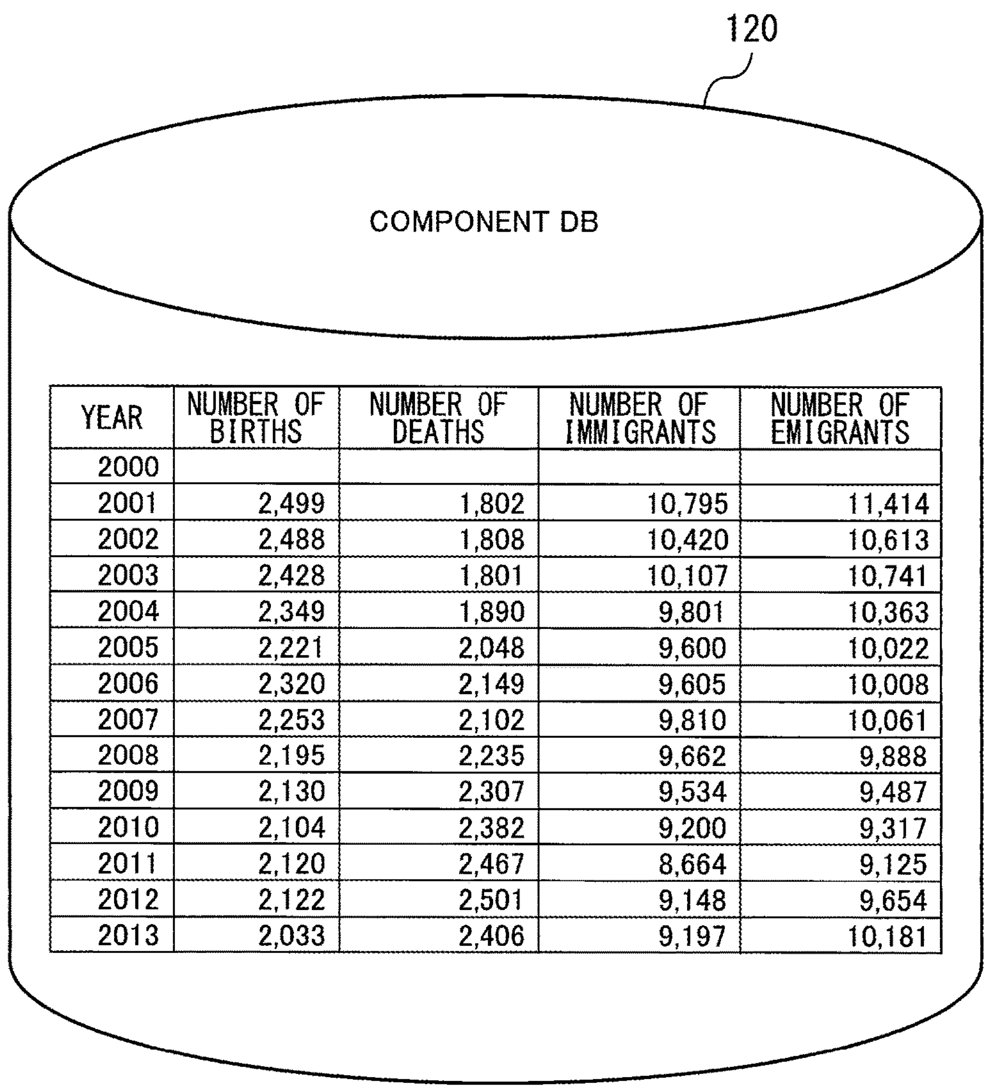
FIG. 5 illustrates an example of a component DB.

FIG. 5 illustrates an example of the component DB. In the component DB 120, values of components of population change are set for each year. Such components are the number of births, the number of deaths, the number of immigrants, and the number of emigrants. The natural growth and decline of a population is represented by the number of births and the number of deaths. The net migration of a population is represented by the number of immigrants and the number of emigrants.

The population projection unit 130 executes a population projection process, by using the information stored in each DB illustrated in FIGS. 4 and 5. In the population projection process, coefficient calculation formulas are first generated to calculate coefficients (birth rate, death rate, immigration rate, and emigration rate) of each year. Thereafter, component calculation formulas are generated to calculate the components (the number of births, the number of deaths, the number of immigrants, and the number of emigrants) of a target year by using the coefficients obtained on the basis of the coefficient calculation formulas. Further, a projection value of future population is calculated by a calculation formula that combines these components and the total population of the previous year which is already calculated. This population projection process can continuously project the future population, in order to provide a population projection result in a highly versatile form, which can be easily applied to scenario analysis and measure introduction effect estimation. Also, a population can be projected with only statistics information (total population, the number of births, the number of deaths, the number of immigrants, and the number of emigrants), such as populations of past 10 years or more which are easily acquired, so that a highly accurate projection result is obtained.

Figure 6:
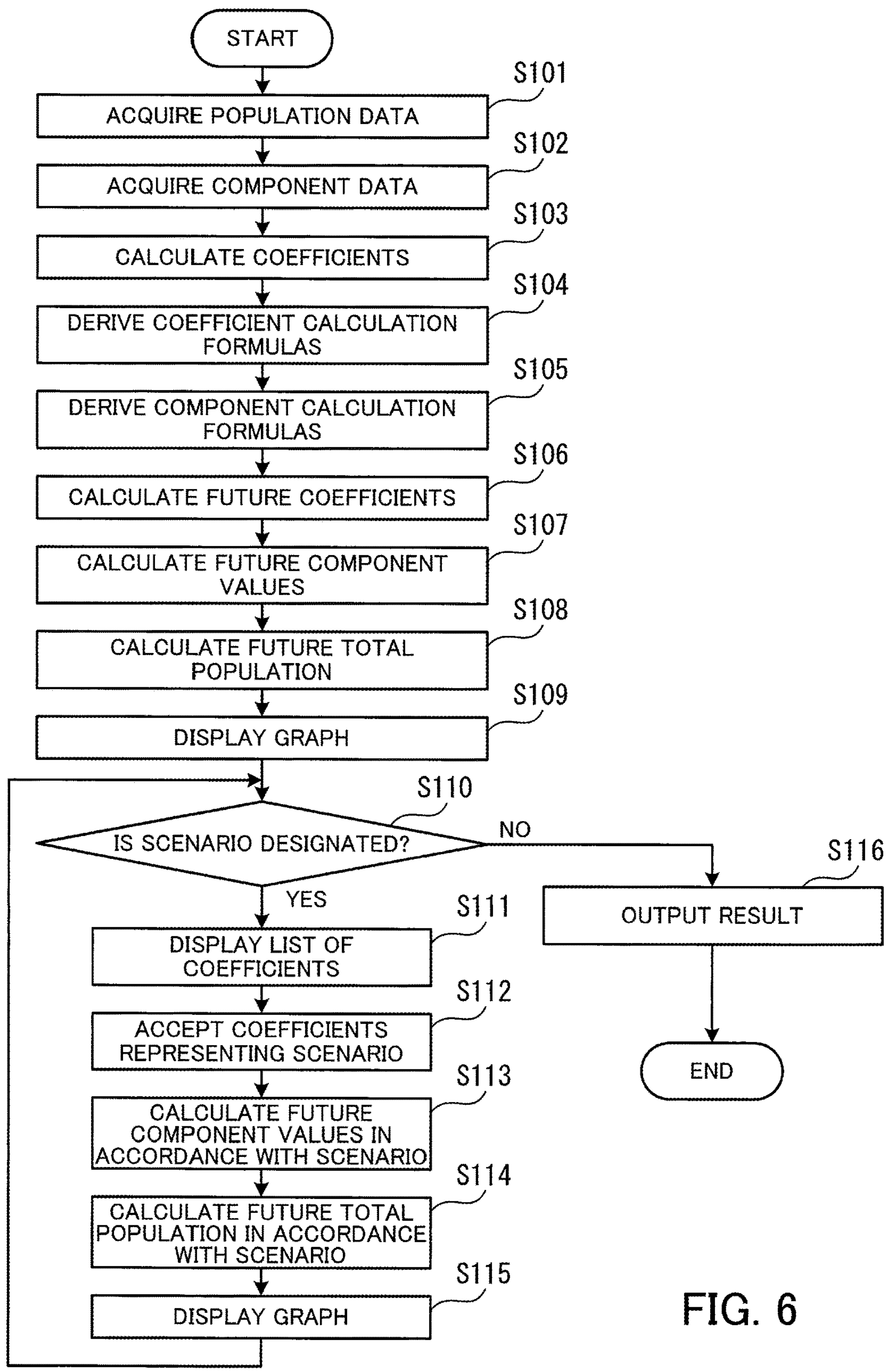
FIG. 6 is a flowchart illustrating an example of a procedure of a population projection process.

In the following, the population projection process will be described in detail. FIG. 6 is a flowchart illustrating an example of the procedure of the population projection process. For example, the population projection process is executed when an instruction of population projection is input.

[Step S101] The population projection unit 130 retrieves population data from the population DB 110. For example, the population projection unit 130 sets the retrieved population data in the past-data management table 141 in the memory unit 140.

[Step S102] The population projection unit 130 retrieves component data from the component DB 120. For example, the population projection unit 130 sets the retrieved component data in the past-data management table 141.

[Step S103] The population projection unit 130 calculates coefficients of each component (birth rate, death rate, immigration rate, and emigration rate), from the past-data values including the population data and the component data, with reference to the past-data management table 141. For example, the birth rate of a certain year can be calculated by dividing the number of births of the year by the total population at the end of the previous year. The population projection unit 130 sets the calculated coefficients in the coefficient management table 142.

[Step S104] The population projection unit 130 derives the coefficient calculation formula of each component. For example, the population projection unit 130 creates an approximate curve from coefficients of a plurality of years, and derives a function for representing the approximate curve as the coefficient calculation formula. The population projection unit 130 stores the derived coefficient calculation formulas in the memory unit 140.

[Step S105] The population projection unit 130 derives the component calculation formula of each component. For example, the population projection unit 130 derives a component calculation formula from multiple regression analysis using the calculated coefficients and the population data as explanatory variables and the component data as a response variable. The population projection unit 130 stores the derived component calculation formulas in the memory unit 140.

[Step S106] The population projection unit 130 calculates a coefficient of each component of each future year, by using the coefficient calculation formula 143 of each component. The population projection unit 130 additionally sets the calculated coefficients in the coefficient management table 142, for example.

[Step S107] The population projection unit 130 calculates a value (a component value) of each component of each future year, by using the component calculation formula 144 of each component, with reference to the past-data management table 141 and the coefficient management table 142. The population projection unit 130 temporarily stores the calculated component values in the memory 102, for example.

[Step S108] The population projection unit 130 calculates a total population by using the coefficients and the component values of the components, with reference to the past-data management table 141 and the coefficient management table 142. For example, the population projection unit 130 calculates the total population of the next year, by using the last population data (initial value). Thereafter, the population projection unit 130 iterates the calculation of the total population of the next year by using the total population of the year for which the total population has been calculated, in order to calculate the total population of each year successively. Thereby, a population projection result of a predetermined future period is obtained.

[Step S109] The population projection unit 130 displays a graph indicating the projection result of the total population.

[Step S110] The scenario setting unit 150 determines whether or not a prediction scenario is designated. For example, when an instruction for setting a scenario is input by a user, the scenario setting unit 150 determines that the prediction scenario is designated. If the prediction scenario is designated, the process proceeds to step S111. If the prediction scenario is not designated, the process proceeds to step S116.

[Step S111] The scenario setting unit 150 displays a list of coefficients. For example, the scenario setting unit 150 acquires the coefficients of the components from the coefficient management table 142 and displays the acquired coefficients on the monitor 21.

[Step S112] The scenario setting unit 150 accepts an input for changing coefficients, which the user inputs into the displayed list of coefficients. The scenario setting unit 150 supplies the list of coefficients that have been changed in accordance with the change input, to the population projection unit 130.

[Step S113] The population projection unit 130 calculates future component values in accordance with the scenario. For example, the population projection unit 130 assigns the coefficients in the list of coefficients received from the scenario setting unit 150 to the component calculation formulas, and calculates component values of respective components of each future year.

[Step S114] The population projection unit 130 calculates a future total population in accordance with the input scenario. For example, the population projection unit 130 calculates a total population of each future year on the basis of the component values calculated in step S113.

[Step S115] The population projection unit 130 displays a graph indicating transition of the total population according to the designated scenario. Thereafter, the process proceeds to step S110.

[Step S116] If the prediction scenario is not designated, the population projection unit 130 outputs the projection result of the total population to the memory 102 or the HDD 103, and ends the process.

In this way, a future total population can be projected only from the information of total population, natural growth and decline, and net migration of the past. Furthermore, an arbitrary scenario of population change can be designated only by changing the coefficient of each component which is generated in the calculation procedure, so as to make the designation of the scenario very easy.

Next, a specific example of the population projection process in accordance with the procedure illustrated in FIG. 6 will be described.

FIG. 7 illustrates an example of the past-data management table. The past-data management table 141 includes fields of year, total population, the number of births, the number of deaths, the number of immigrants, and the number of emigrants. Years for which data have been acquired are set in the field of year. Total populations of those years are set in the field of total population. The numbers of children born in those years are set in the field of the number of births. The numbers of persons who died in those years are set in the field of the number of deaths. The numbers of persons who immigrated from another area in those years are set in the field of the number of immigrants. The number of persons who emigrated to another area in those years are set in the field of the number of emigrants. The coefficients of each component are calculated on the basis of this past-data management table 141.

Figure 8:
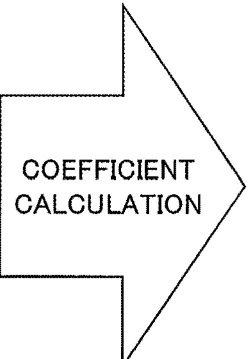
FIG. 8 illustrates a calculation example of coefficients.

FIG. 8 illustrates a calculation example of coefficients. The birth rate of a certain year is obtained by dividing the number of births of the year by the total population of the previous year. For example, the birth rate of year 2001 is calculated by the following calculation formula.

[number of births in year 2001]/[total population in year 2000]=0.00891 (1)

In the same way, the death rate of a certain year is obtained by dividing the number of deaths of the year by the total population of the previous year. The immigration rate of a certain year is obtained by dividing the number of immigrants of the year by the total population of the previous year. The emigration rate of a certain year is obtained by dividing the number of emigrants of the year by the total population of the previous year.

The calculated coefficients are set in the coefficient management table 142. In the coefficient management table 142, a birth rate, a death rate, an immigration rate, and an emigration rate are set for each year. In the example of FIG. 8, the coefficients of each component from year 2001 to year 2013 are set.

Figure 9:
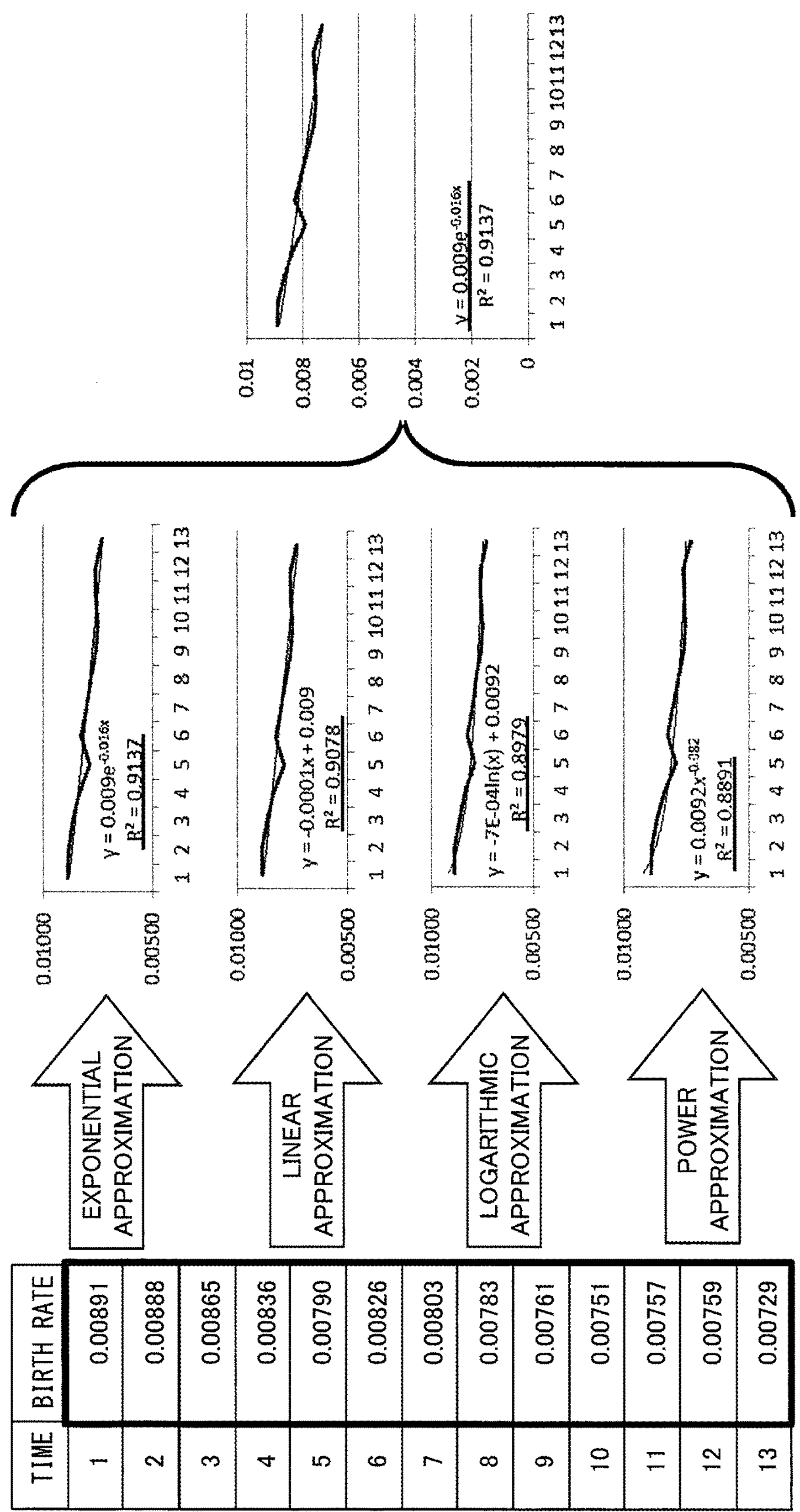
FIG. 9 illustrates an example of how to derive a coefficient calculation formula.

The coefficient calculation formula of each component is obtained on the basis of the coefficients of each component. FIG. 9 illustrates an example of how to derive a coefficient calculation formula. For example, approximate curves are created with respect to each coefficient (birth rate, death rate, immigration rate, and emigration rate), and the approximate equation of the highest decision coefficient ($R^2$ value) is set as the calculation formula. For example, a decision coefficient is obtained by dividing a sum of squared residuals by a sum of squares of differences from an average sample value and subtracting the division result from 1. In this case, the decision coefficient is a value larger than 0 and smaller than 1, and as the decision coefficient is closer to 1, the residual is smaller.

In the example of FIG. 9, an approximate equation of exponential approximation, an approximate equation of linear approximation, an approximate equation of logarithmic approximation, and an approximate equation of power approximation are created, and their decision coefficients are compared with each other. Then, as the decision coefficient of the approximate equation of exponential approximation is the largest, "exponential approximation" is selected, and $y=0.009\times\exp(-0.016x)$ is employed as the coefficient calculation formula. Here, y is a birth rate, and x is a numerical value (1, 2, 3 . . . ) of the last two digits of each year from year 2001 to year 2013 and represents the number of years that have passed since year 2000.

Although in FIG. 9 the coefficient calculation formula of birth rate is calculated, coefficient calculation formulas are derived on the basis of approximate curves of the death rate, the immigration rate, and the emigration rate as well.

Figure 10:
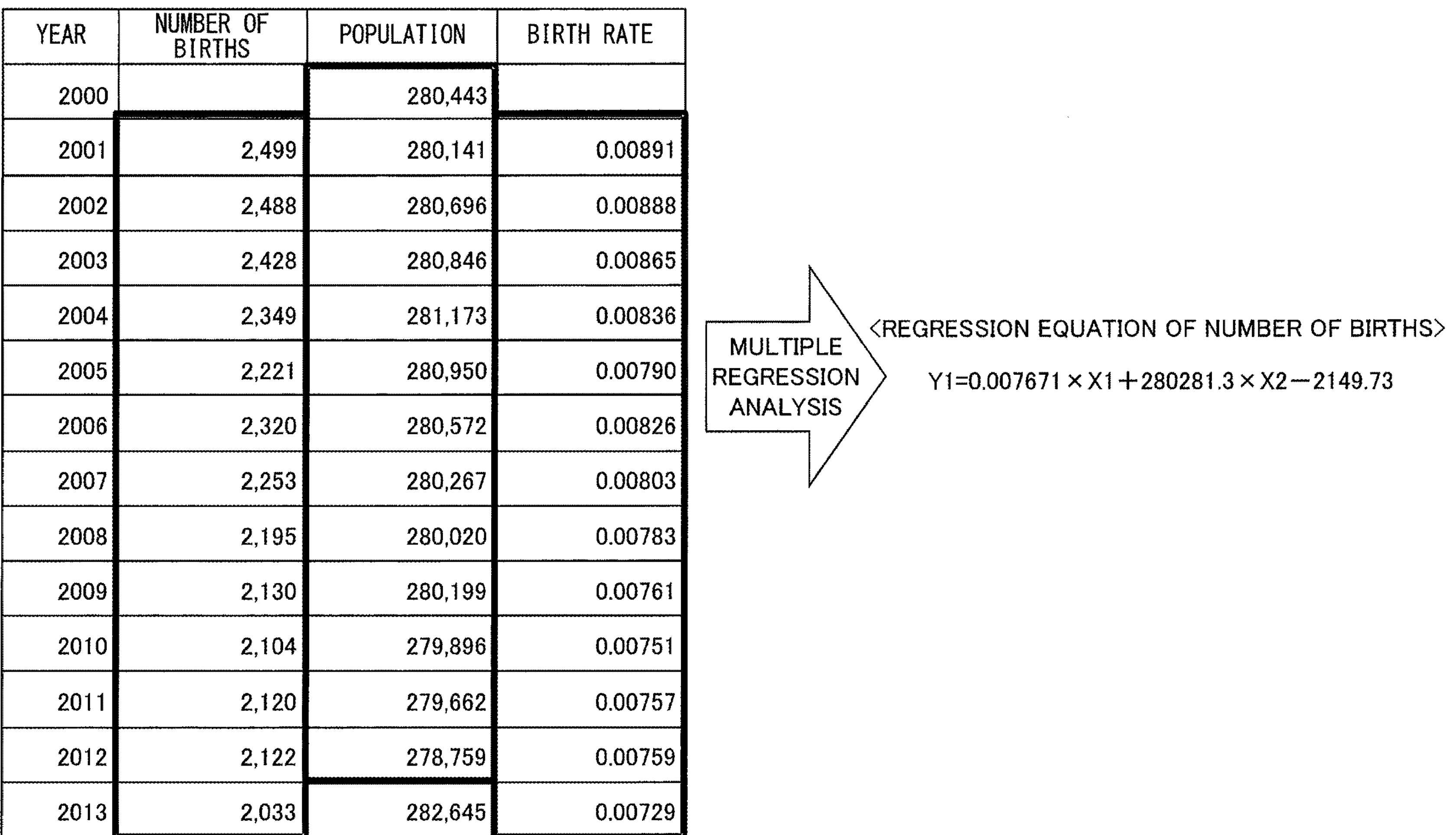
FIG. 10 illustrates an example of how to derive a component calculation formula.

Component calculation formulas are also derived in parallel with the coefficient calculation formulas. FIG. 10 illustrates an example of how to derive a component calculation formula. A component calculation formula is obtained by multiple regression analysis using past-data values of total population and coefficients of each component. In this case, a past-data value of total population and a coefficient of each component are explanatory variables, and a component value is a response variable. For example, in order to obtain a component calculation formula of the number of births, multiple regression analysis is performed by using total population and birth rate as explanatory variables and the number of births as a response variable. In the example of FIG. 10, a regression equation "Y1=0.007671×X1+280281.3×X2−2149.73" is obtained. Here, Y1 is the number of births, and X1 is total population, and X2 is birth rate. The regression equation obtained in this way is taken as the component calculation formula.

A total population is calculated by using the coefficient calculation formula and the component calculation formula which are derived as described above. For example, a future population is projected successively by the below equation to which the total population of a first year (initial value) is given.

$$\text{population}(t)=\text{population}(t-dt)+(\text{number of births}+\text{number of immigrants}-\text{number of deaths}-\text{number of emigrants})\times dt \quad (2)$$

Here, t is a year for which a total population is calculated. Also, dt is equal to 1.0 (year). Here, respective components (the number of births, the number of deaths, the number of immigrants, and the number of emigrants) of equation (2) are obtained from the following component decision equations.

$$\text{number of births}=0.007671\times\text{population}(t-dt)+280281.3\times\text{birth rate}-2149.73 \quad (3)$$

$$\text{number of deaths}=0.008102\times\text{population}(t-dt)+280293.6\times\text{death rate}-2271.33 \quad (4)$$

$$\text{number of immigrants}=0.033604\times\text{population}(t-dt)+280232\times\text{immigration rate}-9416.38 \quad (5)$$

$$\text{number of emigrants}=0.036103\times\text{population}(t-dt)+280243.2\times\text{emigration rate}-10117.3 \quad (6)$$

Also, coefficients (birth rate, death rate, immigration rate, and emigration rate) in equations (3) to (6) are obtained from the following coefficient decision equations.

$$\text{birth rate}=0.00898\times\text{EXP}(-0.01633\times(\text{TIME}+1)) \quad (7)$$

$$\text{death rate}=0.00024\times(\text{TIME}+1)+0.00601 \quad (8)$$

$$\text{immigration rate}=-0.00239\times\text{LN}(\text{TIME}+1)+0.03860 \quad (9)$$

$$\text{emigration rate}=-0.00250\times\text{LN}(\text{TIME}+1)+0.04026 \quad (10)$$

Here, TIME (year) in equations (7) to (10) is a value of the last two digits of a year for which a total population is calculated (i.e., the number of years that have passed since year 2000).

A future total population is calculated by equations (2) to (10). The calculated total population is stored in the memory unit 140 as the projection result 145.

Note that, if"population(t−dt)" of the right hand side of equation (2) is transposed to the left hand side and the both sides are divided by"dt", the left hand side becomes a derivative function of"population(t)". "number of births+number of immigrants−number of deaths−number of emigrants" of the right hand side includes population(t−dt), as in equations (3) to (6). Thus, equation (2) is a differential equation of population.

The population projection unit 130 stores in the memory 102 the values of each coefficient (birth rate, death rate, immigration rate, and emigration rate) calculated by equations (7) to (10), so as to retain the values of each coefficient in the memory 102 even after the projection result 145 is output. For example, the population projection unit 130 sets the values of the coefficients at and after year 2014, which are calculated by equations (7) to (10), in the coefficient management table 142. The coefficients retained in the memory are reutilized at the time of population projection recalculation with a designated scenario.

FIG. 11 illustrates an example of projection result. For example, in the projection result 145, the projection values of total population in future years are set in addition to the past-data values of total population. A graph indicating transition of total population is displayed on the basis of this projection result 145.

Figure 12:
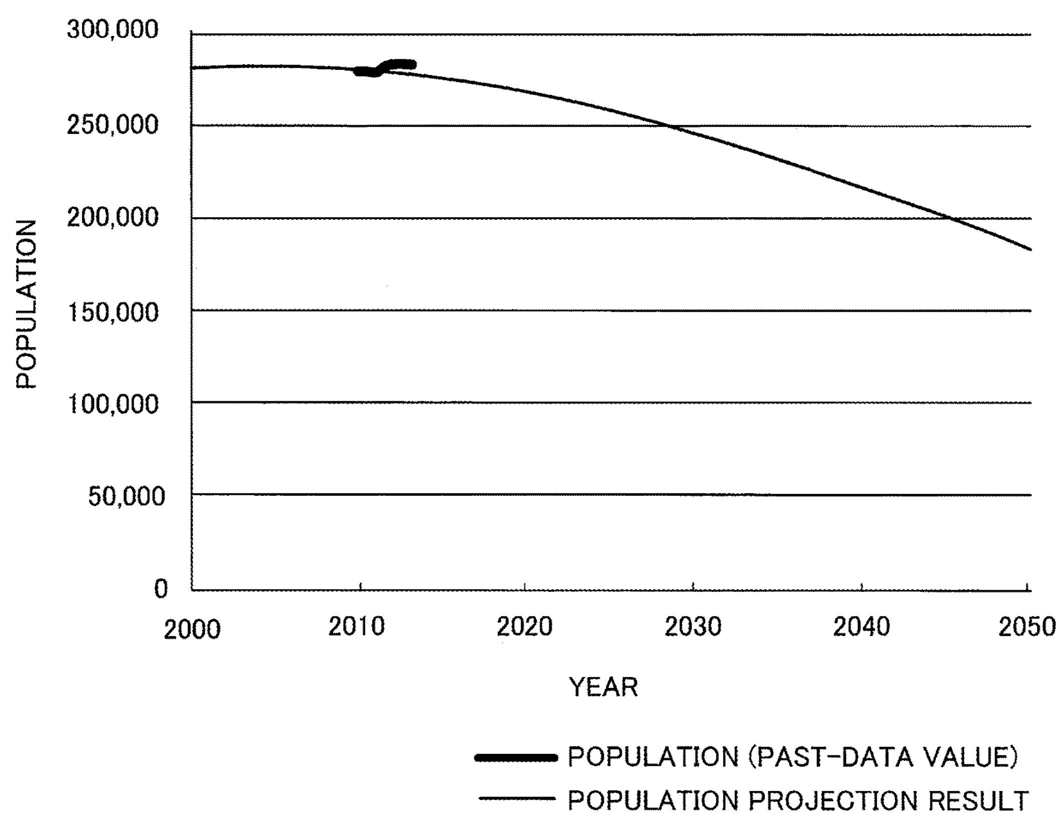
FIG. 12 is a graph indicating a projection result of a total population.

FIG. 12 is a graph indicating a projection result of total population. In the graph illustrated in FIG. 12, the horizontal axis represents year and the vertical axis represents population. In the graph, a line indicates transition of population up to year 2050, and a part of the line at and after year 2014 is the projection result of population up to year 2050 based on the past data up to year 2013. Also, in the graph of FIG. 12, the past data in year 2014 is represented with a thick line. In this example, the annual average error from the past-data values is 0.36%, and a sufficiently accurate projection result is obtained.

The projection result of the total population predicted in this way is based on an assumption that the same environment as the present moment continues with regard to population change. In contrast, an event that affects population change can occur. In the second embodiment, a future total population can be projected on the basis of a scenario that assumes such an event. For example, a total population can be projected under a scenario in which the birth rate increases on an assumption that childcare environment is improved for example by childcare centers that are constructed newly.

When a total population is to be projected in accordance with a specific scenario, the scenario setting unit 150 rewrites coefficient values of components in the coefficient management table 142 to the values according to the target scenario, in accordance with an input from a user, for example.

FIG. 13 illustrates a change example of coefficient values. FIG. 13 illustrates an example when birth rates are changed. Note that FIG. 13 illustrates only the part of the birth rate in the coefficient management table 142.

Here, following"scenario A", "scenario B", and "scenario C" are set on an assumption that a municipality introduces"child raising support program" in year 2016.

Scenario A: the birth rate is improved to 8.96 in year 2016 and maintained until year 2050

Scenario B: the birth rate is improved at 0.1/year every year from year 2016 to year 2050

Scenario C: the birth rate is improved at 0.65/year for 10 years every year from year 2016 and maintained until year 2050

A projection result of total population according to a scenario is obtained by changing values of birth rates in the coefficient management table 142 to birth rates according to the scenario and executing a population projection process using equations (2) to (6). Here, equations (7) to (10) are needless to be calculated, by acquiring the coefficients of each component from the coefficient management table 142. As a result, the total population projection process can be executed efficiently in accordance with the scenario.

Figure 14:
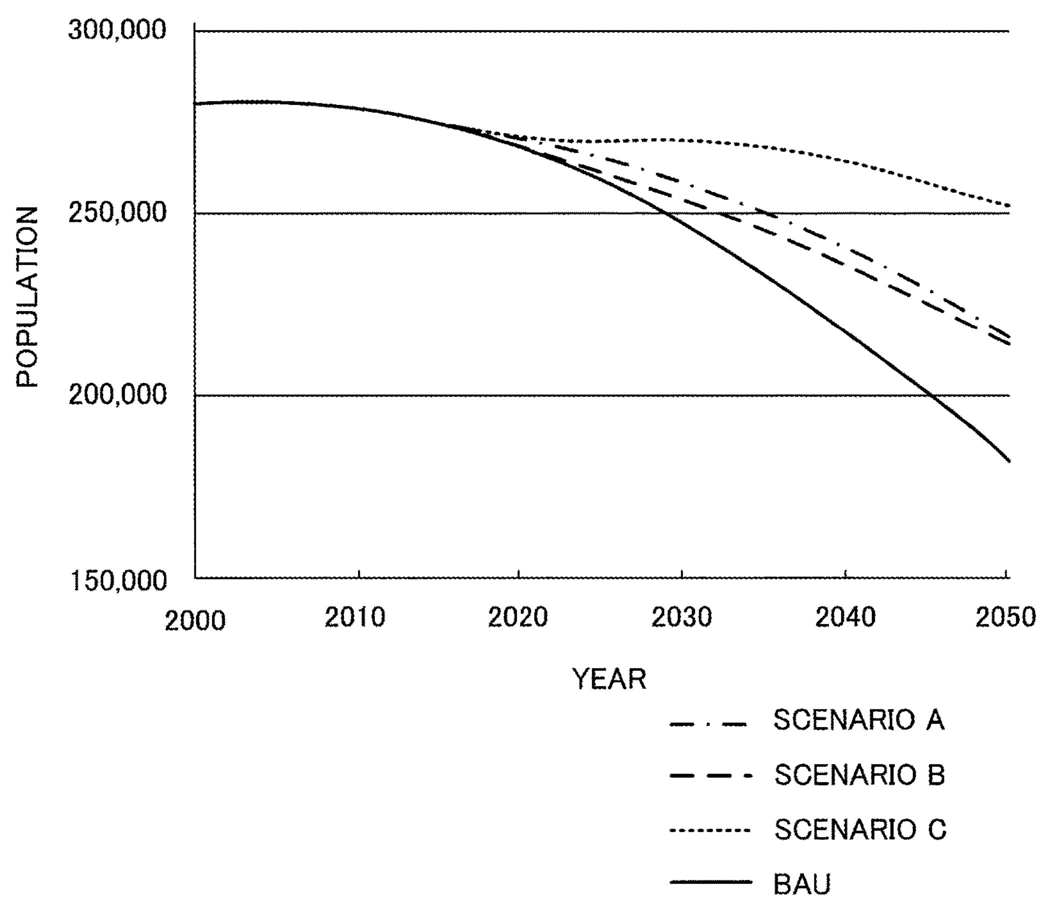
FIG. 14 is a graph indicating results of scenario analysis using a birth rate as a parameter.

FIG. 14 is a graph indicating results of scenario analyses using the birth rate as a parameter. Note that, in FIG. 14, the population projection result illustrated in FIG. 12 is compared as BAU (Business As Usual). The results of scenario analyses indicate that the population, which was 280 thousand people in year 2000, is changed to 220 thousand people in scenario A, 210 thousand people in scenario B, and 250 thousand people in scenario C.

As described above, parameters are finely set to project a population by using the population projection method described in the second embodiment, so that prediction can be performed by reflecting future change as appropriate.

Also, by using the component calculation formula of the number of births, a population of 0 to 5 years olds in each year can be figured out, for example. That is, the summation of the numbers of births in the past 6 years before a calculation target year can be set as the population of 0 to 5 years olds in the calculation target year. As described above, transition of the number of facilities, such as childcare center, appropriate for transition of the population of a specific age group can be calculated by effectively utilizing the component calculation formulas.

Figure 15:
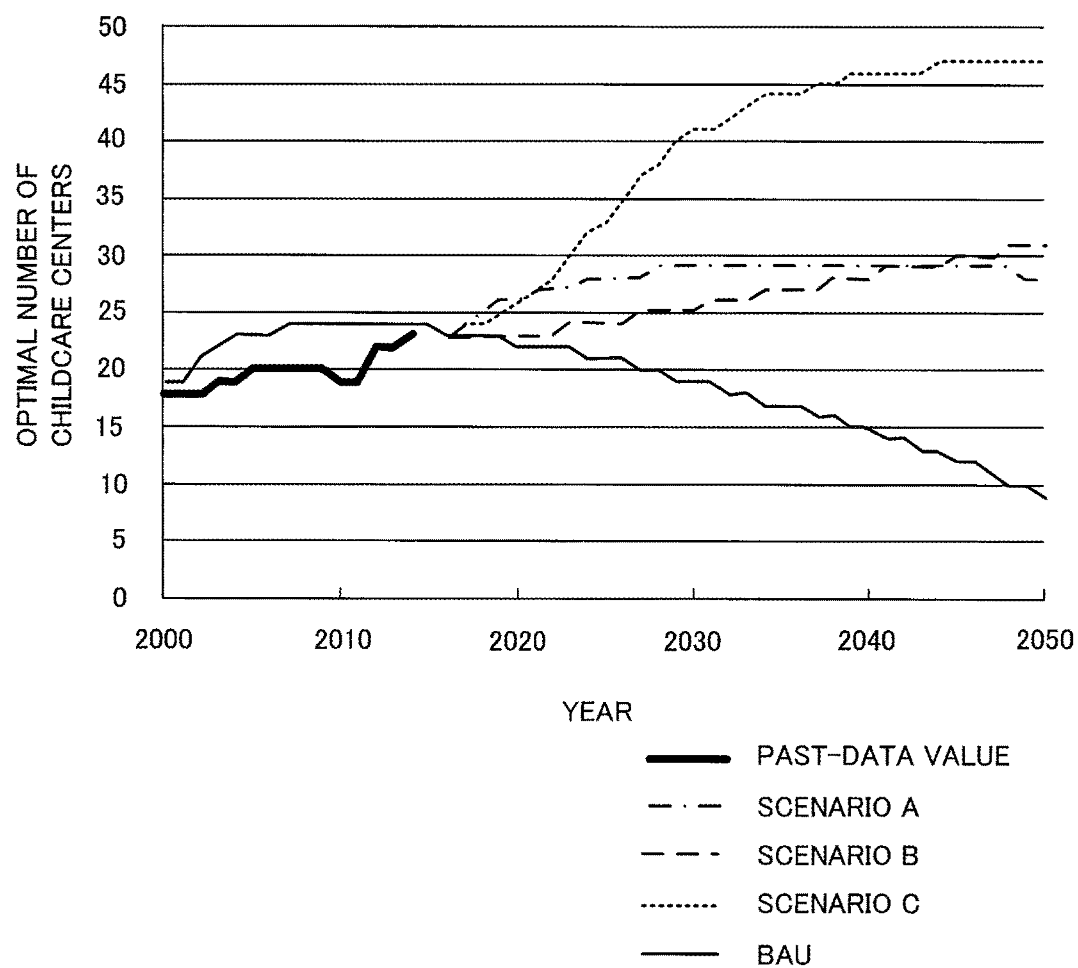
FIG. 15 is a graph indicating an example of the optimal number of childcare centers according to scenarios.

FIG. 15 is a graph indicating an example of the optimal number of childcare centers according to the scenarios. FIG. 15 illustrates a graph indicating projection results of the optimal number of operated facilities (the number of childcare centers) when a municipality introduces"child raising support program" in year 2016. Specifically, the population projection unit 130 figures out the population of 0 to 5 years olds on the basis of BAU and the scenario analysis result of FIG. 14, and projects a childcare center usage rate in order to project the number of optimal childcare centers from year 2000 to year 2050.

The projection result illustrated in FIG. 15, particularly comparison between past-data value and BAU, indicates that the number of childcare centers is insufficient in years 2000 to 2013, and thus suggest a possibility of waiting children. Also, the improvement of birth rate in each scenario indicates that the current number of childcare centers is too small, and that it is appropriate to increase the number of childcare centers simultaneously, when introducing the child raising support program. Conversely, the BAU indicates that the future number of childcare centers is saturated, and thus the cost can be reduced by reducing the childcare centers.

As described above, not only scenario analysis of population projection, but also future prediction of the matters highly related to population change can be performed, by using the population projection method illustrated in the second embodiment.

Although the embodiments are illustrated in the above, the configuration of each unit illustrated in the embodiments can be replaced by another device having the same function. Also, optional configurations and processes may be added. Further, two or more configurations (features) of the aforementioned embodiments may be combined arbitrarily.

In one aspect, scenario analysis is easily performed, assuming a change of a component that affects future population change.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A population projection method comprising:

deriving, by a processor, relational equations each representing a relationship between a change rate indicating an increased or decreased proportion relative to a population and an elapsed time period from a start time of a first period, with respect to a plurality of population changing components, based on component information indicating past values of the population changing components in a specific area in each year within the first period, wherein the population changing components are a number of births, a number of deaths, a number of immigrants, and a number of emigrants relevant to population dynamics;

deriving, by the processor, regression equations for calculating values of the population changing components, from multiple regression analysis using a population and change rates of the population changing components as explanatory variables and the population changing components as response variables, based on population information indicating a population of each year within the first period and the component information;

calculating, by the processor, change rates of the population changing components in each year within a second period that starts from a year after the first period, based on the relational equations;

storing the calculated change rates in a memory;

acquiring the calculated change rates from the memory when change rates are input as a scenario;

changing, by the processor, a part of the calculated change rates to the input change rates;

acquiring, by the processor, a population of a last year of the first period, and for each year within the second period in order from a first year of the second period as a population calculation target year;

calculating, by the processor, values of the population changing components in a population calculation target year, from the previous population of a year before the population calculation target year and the calculated change rates or the input change rates of the population changing components of the population calculation target year, on the basis of the regression equations of the population changing components; and calculating, by the processor, a population of the population calculation target year by adding the number of births and the number of immigrants of the population calculation target year to and subtracting the number of deaths and the number of emigrants of the population calculation target year from the previous population.

2. The population projection method according to claim 1, wherein the deriving includes calculating change rates each indicating a proportion relative to a population of each year within the first period, with respect to the population changing components, based on the component information, and taking, as the relational equations, approximate equations representing temporal changes of the change rates of the respective population changing components.

3. A non-transitory computer-readable storage medium storing a computer program that causes a computer to execute a process comprising:

deriving relational equations each representing a relationship between a change rate indicating an increased or decreased proportion relative to a population and an elapsed time period from a start time of a first period, with respect to a plurality of population changing components, based on component information indicating past values of the population changing components in a specific area in each year within the first period, wherein the population changing components are a number of births, a number of deaths, a number of immigrants, and a number of emigrants relevant to population dynamics;

deriving regression equations for calculating values of the population changing components, from multiple regression analysis using a population and change rates of the population changing components as explanatory variables and the population changing components as response variables, based on population information indicating a population of each year within the first period and the component information;

calculating change rates of the population changing components in each year within a second period that starts from a year after the first period, based on the relational equations;

storing the calculated change rates in a memory;

acquiring the calculated change rates from the memory when change rates are input as a scenario;

changing a part of the calculated change rates to the input change rates; and acquiring a population of a last year of the first period, and for each year within the second period in order from a first year of the second period as a population calculation target year;

calculating values of the population changing components in a population calculation target year, from the previous population of a year before the population calculation target year and the calculated change rates or the input change rates of the population changing components of the population calculation target year, on the basis of the regression equations of the population changing components; and calculating a population of the population calculation target year by adding the number of births and the number of immigrants of the population calculation target year to and subtracting the number of deaths and the number of emigrants of the population calculation target year from the previous population.

4. A population projection apparatus comprising:

a memory configured to store component information indicating past values of a plurality of population changing components in a specific area in each year within a first period, and population information indicating a population of a last year of the first period, wherein the population changing components are a number of births, a number of deaths, a number of immigrants, and a number of emigrants relevant to population dynamics; and a processor configured to execute a process including:

deriving relational equations each representing a relationship between a change rate indicating an increased or decreased proportion relative to a population and an elapsed time period from a start time of the first period, with respect to the population changing components, based on the component information;

deriving regression equations for calculating values of the population changing components, from multiple regression analysis using a population and change rates of the population changing components as explanatory variables and the population changing components as response variables, based on population information indicating a population of each year within the first period and the component information;

calculating change rates of the population changing components in each year within a second period that starts from a year after the first period, based on the relational equations;

storing the calculated change rates in a memory;

acquiring the calculated change rates from the memory when change rates are input as a scenario;

changing a part of the calculated change rates to the input change rates; and acquiring a population of a last year of the first period, and for each year within the second period in order from a first year of the second period as a population calculation target year, calculating a population of the population calculation target year;

calculating values of the population changing components in a population calculation target year, from the previous population of a year before the population calculation target year and the calculated change rates or the input change rates of the population changing components of the population calculation target year, on the basis of the regression equations of the population changing components; and calculating a population of the population calculation target year by adding the number of births and the number of immigrants of the population calculation target year to and subtracting the number of deaths and the number of emigrants of the population calculation target year from the previous population.

* * * * *